June 17, 1930.  L. D. SOUBIER  1,764,361
GLASS FORMING MACHINE
Filed Nov. 15, 1926   3 Sheets-Sheet 1
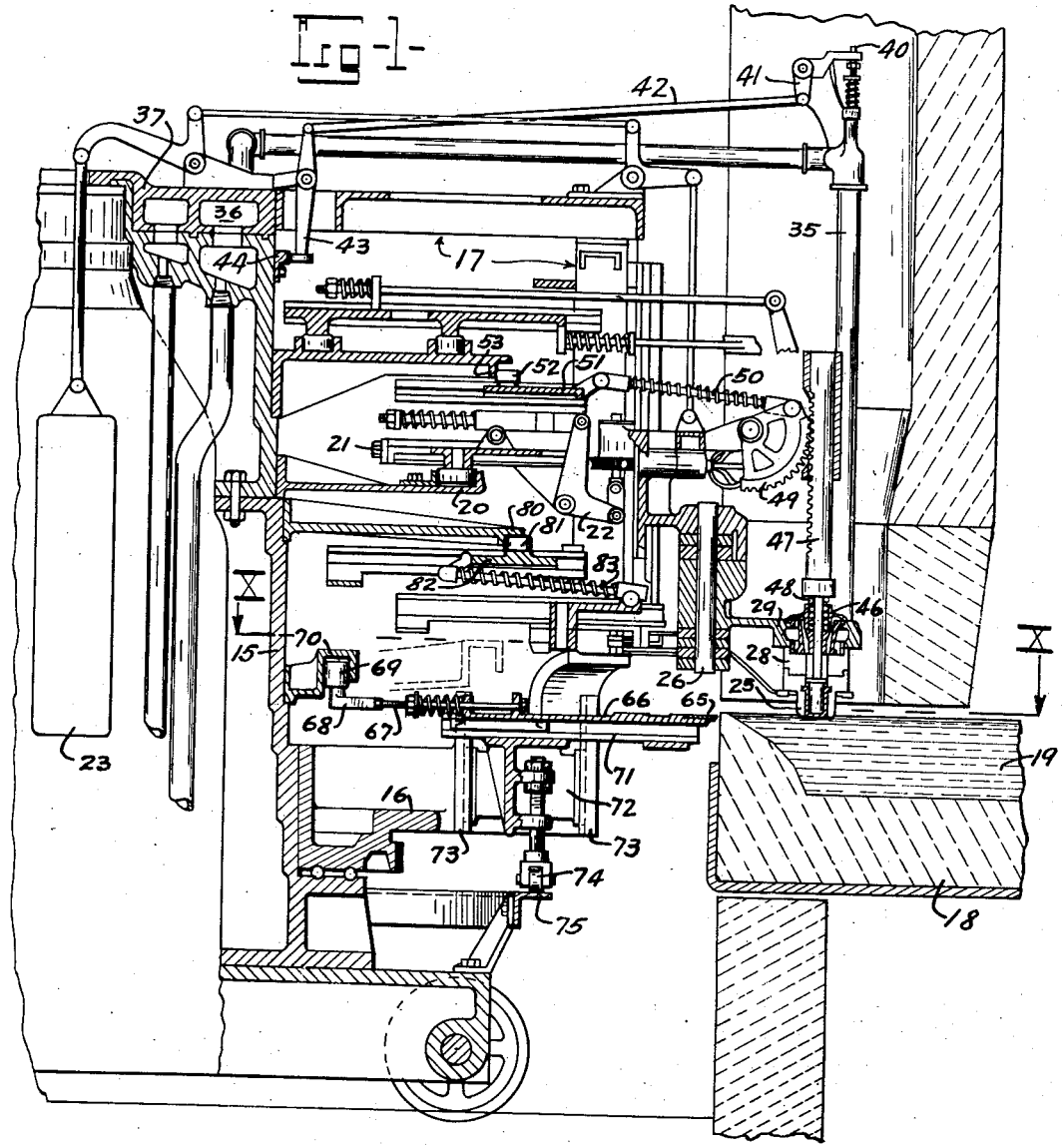
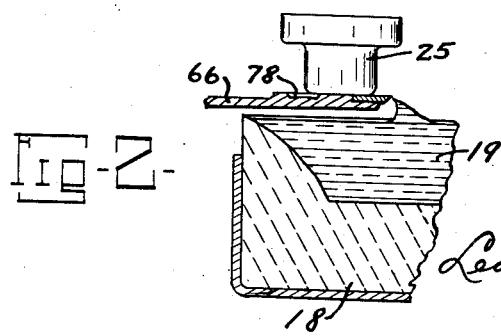
INVENTOR
Leonard D. Soubier
BY
J. F. Rule,
HIS ATTORNEY

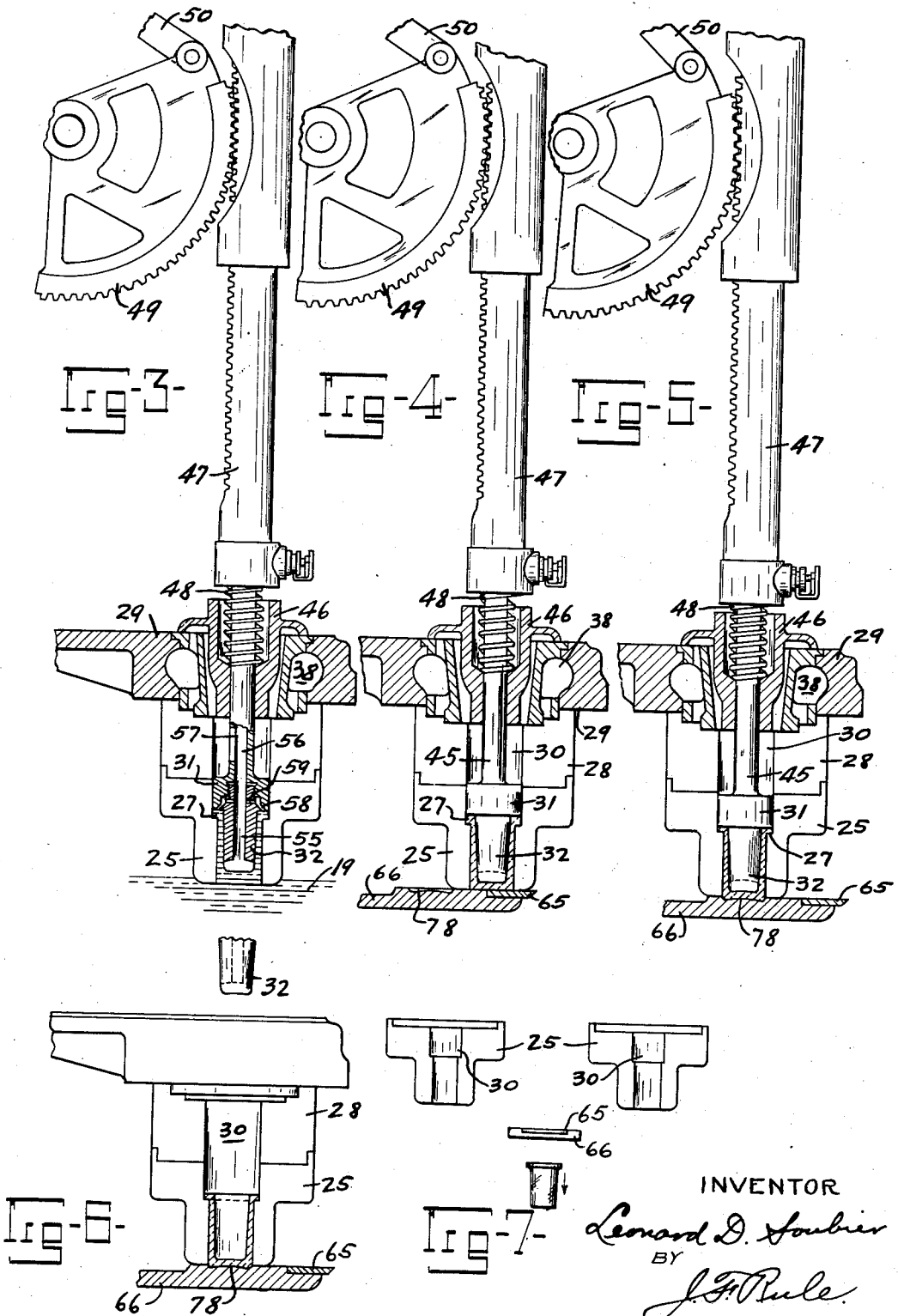

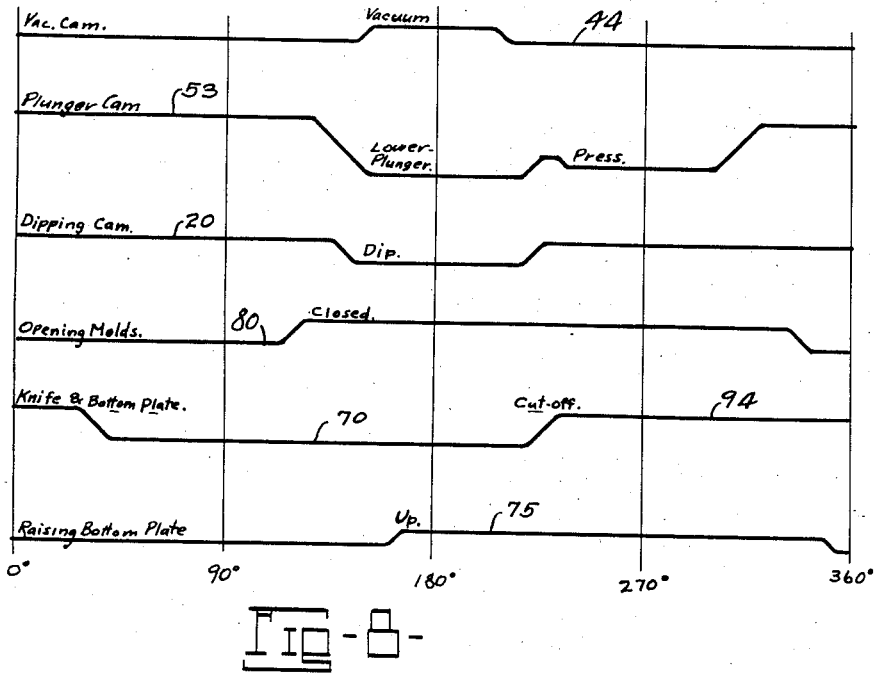
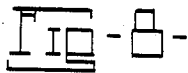
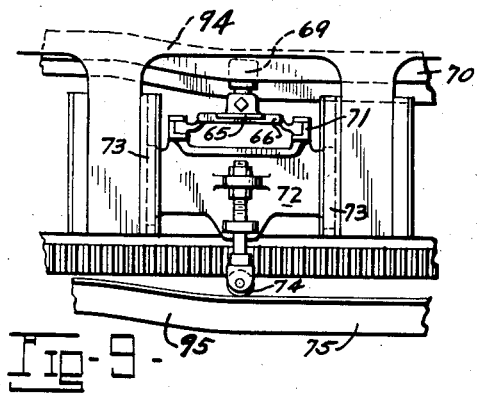
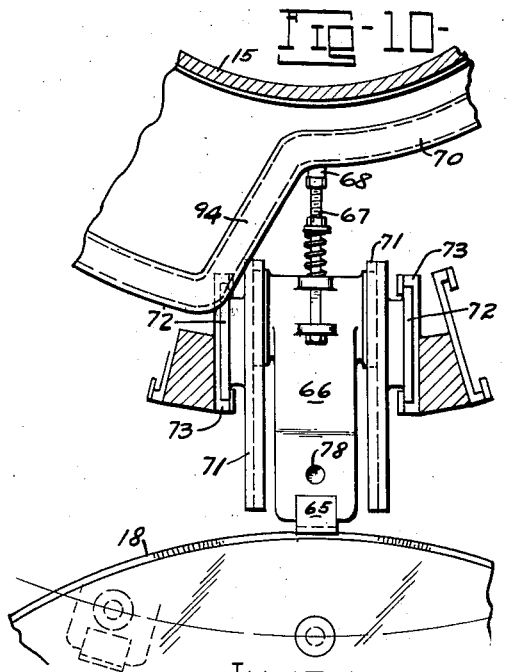

Patented June 17, 1930

1,764,361

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS-FORMING MACHINE

Application filed November 15, 1926. Serial No. 148,324.

My invention relates to improvements in an apparatus for shaping glass articles and as herein shown is embodied in a machine in which the glass is gathered by suction, such type of machine being shown, for example, in the U. S. patent to La France, No. 1,185,687, June 6, 1916, to which reference may be had for a full disclosure of such a machine.

An objection of the present invention is to provide means whereby a charge of glass, delivered to a mold by suction, may be pressed to the final form of an article being produced, without necessitating transfer of a partly formed article from one mold to another at different stages of production. To this end, the mold is associated with a suction gathering head which operates at intervals to draw charges of glass into the mold. A shaping member is movable into and out of the mold to give proper interior formation to the article being produced and to press and thereby set the glass making up the article. There is also associated with the above enumerated elements, means for cutting off the charge from the supply body of glass and closing the mold during the pressing operation.

Other objects of the invention will appear hereinafter.

In the accompanying drawings:

Figure 1 is a part sectional elevation of a machine constructed in accordance with my invention.

Figure 2 is a detail part sectional elevation showing the manner in which the cut-off moves across the bottom of the shaping mold.

Figure 3 is a detail part sectional elevation showing the shaping mold and core or plunger during the charging of the mold.

Figure 4 is a view similar to Figure 3, but shows the core in elevation and the cut-off just after it has severed portions of glass from the charge and closed the bottom of the mold.

Figure 5 is a view similar to Figure 4, but shows the bottom plate and shaping member in the final article shaping position.

Figure 6 is a part sectional elevation showing the formed article just after the core has been removed and prior to ejection from the mold.

Figure 7 is a detailed view showing the formed article being ejected from a mold.

Figure 8 is a diagrammatic illustration of the stationary cam layout.

Figure 9 is a front elevation of mechanism for actuating the cut-off and bottom plate.

Figure 10 is a sectional elevation taken at the line X—X of Figure 1.

Referring to the accompanying drawings, this machine includes a central stationary pillar or column 15 and a mold carriage 16 which rotates continuously about said pillar. The carriage may be driven by any approved mechanism. Mounted on the carriage and rotatable therewith is an annular series of heads or frames 17, each frame carrying a mold and suitable operating mechanism associated therewith. Associated with each mold, which is in the form of a combined blank and finish mold, is a gathering head which operates to draw charges of glass into said mold by suction at proper intervals. A pressing and shaping member is also associated with each mold. As the carriage rotates, the molds are brought successively over a gathering tank 18 containing molten glass 19. As the mold passes over the tank, the frame 17 mounting said mold is lowered to cause the lower open charge receiving end of the mold to dip into the glass to receive its charge in a manner to be described hereinafter. Lifting and lowering of each mold carrying frame is controlled by a stationary cam 20 fixed to the stationary pillar 15, on which cam runs a roll carried by a head 21, mounted for radial movement on the mold carriage and connected to the frame 17 through a link and a bell crank 22. The weight of each frame or unit 17 is counterbalanced by a weight 23 in an obvious manner, substantially as in the patent above identified.

Each mold 25 includes a pair of cooperating sections movable toward and from each other, each having a carrying arm fulcrumed to a hinge pin 26. Each mold is formed with an open lower end providing an entrance to a cavity whose wall formation corresponds to the exterior surface of the article being produced. In this instance, the article includes a radial lip around its upper end and consequently the mold cavity is formed with an annular radial shoulder 27 to form this lip. An intermediate section 28 is arranged between the upper end of the mold 25 and a blowing or gathering head 29, and is formed with an elongated cavity 30 in which the guide or head 31 of a shaping member or press plunger 32 is movable. A vertical pipe 35 is mounted on each frame and is comprised in a vacuum passage extending from the vacuum chamber 36 in the distributing head 37 to the annular chamber 38 in the gathering head 29. The application of vacuum within the gathering head 29 and mold 25 is controlled by a valve (not shown) in the lower end of the vacuum pipe 35, said valve having a stem 40 extending vertically through the pipe and actuated by a bell crank 41 connected through a link 42 with a lever 43. This lever carries a cam roll engaging a stationary cam 44 which is formed (see Fig. 8) to open the valve when the molds is in gathering position.

Before vacuum is applied to the mold, the shaping member 32 is projected into the mold cavity to a station approaching the limit of projection (see Figs. 3 and 4). This shaping member is of a surface formation corresponding to the interior of the article being produced and is connected through the aforementioned guide or head 31 to an upwardly extending stem 45. The shaping member 32 (see Fig. 3) is separably connected to said head 31 and is formed with a central axial passageway 55 aligned and communicating with a longitudinal passageway 56 in the stem 45. This latter passageway communicates through a slot 57 with the cavity 30 in the intermediate section 28 and with the vacuum chamber 38 in said blow head 29. This arrangement permits application of vacuum at the lower end of the mold cavity. In order that vacuum may be applied to the upper end of the mold cavity, particularly at the lip forming area, the shaping member 32 and guide or head 31 are spaced apart to form an annular passage 58 which communicates with the longitudinal passageways 55 and 56 through radial openings 59. Thus, it is seen that vacuum is so applied to the mold cavity that uniform distribution of glass is attained at the time the mold is charged.

The stem 45 carrying the shaping member 32 (Figs. 3, 4 and 5) extends through the hood or cap 46 of the blowing head and is separably connected by any approved means with a rack bar 47. This hood or cap 46 is slidably mounted on the stem or rod 45 and is held upon its seat by means of a coil spring 48. A gear segment 49 is mounted on each unit or frame 17 and runs in mesh with the rack 47 to raise and lower the shaping member 32 at proper intervals. This gear segment 49 is connected through a link 50 with a slide 51 carrying a cam roll 52 running upon a stationary cam 53 fixed to the pillar 15. This cam 53 (see Fig. 8) causes periodic radial movement of the slide 51 and up and down movement of the shaping member 32 in timed relation to the movements of the other elements. While the shaping member 32 is projected into the mold cavity as shown in Figs. 3 and 4, and during the period of contact between the charge receiving end of the mold and the molten glass 19, vacuum is applied to the mold through the pipe 35 and the shaping member, causing a charge of glass to be drawn into the mold by suction.

After a charge of glass has been drawn into the mold 25, a cut-off is operated to sever the glass in the mold from the supply body 19 in the tank 18. This cut-off includes a blade 65 carried by a radially movable arm 66 whose inner end is connected through a link 67 with an elbow 68 which carries a cam roll 69 running in a stationary cam 70, the latter being mounted upon the stationary pillar 15. A coil spring surrounding the link 67 operates to prevent breaking or injury of the apparatus at this point in the event portions should become jammed or otherwise inoperative. This cam 70 (see Figs. 1, 8 and 10) is formed with a sharp offset to quickly move the arm 66 radially in guides 71 at proper intervals to sever charges of glass from the supply body 19. Also, this cam 70 is formed with a raised portion 94 (Figs. 8 and 9) permitting lifting of the arm 66 when necessary. The guides 71, in which the arm 66 slides radially, are mounted upon vertical slides 72 movable in guides 73. These vertical slides 72 carry a cam roll 74 running on a stationary cam 75 mounted upon the base of the machine. This cam 75 (see Fig. 8) is formed with raised portions 95 to cause periodic up and down movement of the arm 66, which carries the cut-off. Radial movement of the arm 66 first causes severance of the charge from the supply body of glass (see Figs. 2 and 4), and with continuation of such outward movement, assumes the position shown in Figs. 5 and 6 wherein a bottom plate 78 carried by said arm, closes the charge receiving end of the mold. This bottom plate 78 is formed with a recess (Fig. 6) of a shape to correspond with the bottom formation of the article being produced. After the arm 66 has been moved radially to position the bottom plate 78 so that it closes the lower end of the mold and aligns the recess and mold cavity (see Fig. 5), the stationary cam 53 (see Figs. 1 and 8) operates to give the shaping member the final downward movement to the position shown in Fig. 5 so that the glass is pressed and set in precisely the form of the article being produced. This final projection of the shaping member to its inward limit completely compacts the glass and is intended to prevent production of ware having irregular surface formation or other defects. After this pressing operation, the cam 53 operates to lift the shaping member 32, with its associated parts, including the hood 46, away from the mold 25 (see Fig. 6). Substantially simultaneously with lifting of the shaping member 32, the cams 75 and 70 operate to lower the bottom plate 78 out of engagement with the mold, and inwardly from the latter. This movement is continued until the bottom plate and cut-off assume substantially the position shown in Fig. 1, such positioning of these parts clearing the path followed by an article as it is ejected from the mold.

The mold sections are separated after the shaping member and bottom plate have been separated therefrom as above stated. A stationary cam 80 engaging a cam roll 81, moves a slide 82 radially of the machine. This slide 82 is connected through a link 83 to arms carried by the mold sections so that the sections may be separated at proper intervals and in timed relation with movement of the shaping member and bottom plate.

The operation of the machine may be briefly stated as follows: A frame 17 moves to bring a mold 25 over the supply body of glass 19, and while in this position said frame is lowered to engage the lower end of the mold with the glass. Just prior to this engagement between the mold and the supply body of glass, the shaping member is projected into the mold cavity substantially as shown in Figs. 1, 3 and 4 to give proper initial form to the charge delivered to the mold cavity. Cam mechanism including the cam 44 operates to open the valve in the vacuum pipe 35, causing suction through the blowing head and passageways in the shaping member 32 and guide 31, thereby filling the space around said shaping member with molten glass. The cut-off 65 is then moved radially by the cam 70 to shear the surplus glass from the charge, and, with continued movement of this cut-off, the bottom plate 78 is brought to a position to close the lower end of the mold (see Figs. 5 and 6). The shaping member 32 is then projected further into the mold cavity by action of the cam 53, causing compacting of the glass and pressing of the article to its final form. The cam 53 then causes lifting of the shaping member 32 entirely out of the mold cavity, and simultaneously with this operation the bottom plate 78 is lowered and moved inwardly from the mold. The mold sections may now be separated (Fig. 7) by the action of the cam 80 and the ware ejected from the mold in any approved manner.

Manifestly, certain minor changes may be resorted to within the spirit and scope of the appended claims.

What I claim is:

1. In a machine for forming glass articles, the combination of a mold, a plunger projecting into the mold through one end thereof and having a surface formation corresponding to the interior surface of the article to be formed, the mold and plunger together providing a mold cavity closely approximating the size and shape of the finished article, means for introducing molten glass by suction into the mold through the end thereof opposite to that through which the plunger projects and thereby substantially completely filling said mold cavity, means for severing the glass at the filling end of the mold, a closure plate movable into position to close said filling end, and means for forcing the plunger further into the mold while the closure plate is in mold closing position and thereby compressing the glass in the mold.

2. In a machine for forming glass articles, the combination of a mold, a plunger projecting into the mold through one end thereof and having a surface formation corresponding to the interior surface of the article to be formed, the mold and plunger together providing a mold cavity closely approximating the size and shape of the finished article, means for introducing molten glass by suction into the mold through the end thereof opposite to that through which the plunger projects and thereby substantially completely filling said mold cavity, means for severing the glass at the filling end of the mold, a closure plate movable into position to close said filling end, and means for forcing the plunger further into the mold while the closure plate is in mold closing position and thereby compressing the glass in the mold, said closure plate being formed with a recess or depression therein in register with the mold opening into which the glass is forced by said compressing movement of the plunger.

3. In a machine for forming glass articles, the combination of a mold open at its lower end to receive a charge of molten glass, a plunger projecting downward into the mold, the surface of said plunger conforming to the interior surface of the article to be formed, said plunger and mold together providing a mold cavity closely approximating the shape of the article, means to dip the mold into a supply body of molten glass, means for applying suction through the upper end of the mold and thereby filling such mold cavity with glass, a knife movable across the bottom of the mold to sever the glass, a bottom plate movable into position to close the lower end of the mold and means for imparting a slight downward movement to the plunger when said bottom plate is in position and thereby compressing the glass in the mold.

Signed at Toledo, in the county of Lucas and State of Ohio, this 12th day of November, 1926.

LEONARD D. SOUBIER.